(12) United States Patent
Kolbegger et al.

(10) Patent No.: US 9,614,962 B2
(45) Date of Patent: Apr. 4, 2017

(54) SYSTEM AND METHOD FOR ANALYZING AND CLASSIFYING CALLS WITHOUT TRANSCRIPTION

(71) Applicant: Marchex, Inc., Seattle, WA (US)

(72) Inventors: Chris Kolbegger, Bainbridge Island, WA (US); Jason Flaks, Redmond, WA (US); Tim Graber, Issaquah, WA (US); Bryan Rieger, Mill Creek, WA (US); Ziad Ismail, Seattle, WA (US); Govindaraj Ramanathan, Redmond, WA (US); Darren Spehr, Seattle, WA (US); Matthew Berk, Seattle, WA (US)

(73) Assignee: Marchex, Inc., Seattle, WA (US)

(*) Notice: Subject to any disclaimer, the term of this patent is extended or adjusted under 35 U.S.C. 154(b) by 0 days.

(21) Appl. No.: 14/834,196

(22) Filed: Aug. 24, 2015

(65) Prior Publication Data

US 2015/0365530 A1    Dec. 17, 2015

Related U.S. Application Data

(63) Continuation of application No. 13/842,769, filed on Mar. 15, 2013, now Pat. No. 9,118,751.

(51) Int. Cl.
*H04M 1/64* (2006.01)
*H04M 3/51* (2006.01)
(Continued)

(52) U.S. Cl.
CPC .......... *H04M 3/5175* (2013.01); *G10L 25/51* (2013.01); *G10L 25/93* (2013.01); *H04M 3/2281* (2013.01);
(Continued)

(58) Field of Classification Search
CPC .......... H04M 3/5175; H04M 1/72569; H04M 1/72577; H04M 3/2281; H04M 3/42059;
(Continued)

(56) References Cited

U.S. PATENT DOCUMENTS 6,363,145 B1*   3/2002  Shaffer ............... H04M 3/2281
                                                    379/265.02
2001/0024497 A1*  9/2001  Campbell ........... H04M 3/5125
                                                    379/265.09
(Continued)

*Primary Examiner* — Akelaw Teshale
(74) *Attorney, Agent, or Firm* — Perkins Coie LLP

(57) ABSTRACT

A facility and method for analyzing and classifying calls without transcription. The facility analyzes individual frames of an audio to identify speech and measure the amount of time spent in speech for each channel (e.g., caller channel, agent channel). Additional telephony metrics such as R-factor or MOS score and other metadata may be factored in as audio analysis inputs. The facility then analyzes the frames together as a whole and formulates a clustered-frame representation of a conversation to further identify dialog patterns and characterize call classification. Based on the data in the clustered-frame representation, the facility is able to make estimations of call classification. The correlation of dialog patterns to call classification may be utilized to develop targeted solutions for call classification issues, target certain advertising channels over others, evaluate advertising placements at scale, score callers, and to identify spammers.

20 Claims, 7 Drawing Sheets

(51) Int. Cl.
*G10L 25/51* (2013.01)
*H04M 3/22* (2006.01)
*G10L 25/93* (2013.01)
*H04M 3/42* (2006.01)
*G10L 25/78* (2013.01)
*H04L 12/24* (2006.01)
*H04L 12/26* (2006.01)

(52) U.S. Cl.
CPC ..... *H04M 3/42221* (2013.01); *H04M 3/5166* (2013.01); *G10L 25/78* (2013.01); *H04L 41/5067* (2013.01); *H04L 43/0852* (2013.01); *H04M 2203/559* (2013.01)

(58) Field of Classification Search
CPC .. H04M 3/436; H04M 3/537; H04M 2201/41; H04M 3/2227; H04M 7/0084; H04M 7/006; H04M 7/0075; H04M 15/47; H04M 15/8083; H04M 1/6505; H04M 1/72522; H04M 1/72552; H04M 1/72572; H04M 1/72597; H04M 3/2218; H04M 3/42; H04M 3/42229; H04M 3/518
USPC ....... 379/32.01, 39, 45, 88.01, 88.02, 88.08, 379/88.16, 88.22, 101.01, 242, 2, 379/65.05–266.02, 265.03, 112.09, 189, 379/201.12, 204.01, 265.12
See application file for complete search history.

(56) References Cited

U.S. PATENT DOCUMENTS

2007/0127509 A1* 6/2007 Lin .................. H04L 29/06027 370/401
2007/0248022 A1* 10/2007 Kumar ............... H04L 12/2602 370/252
2008/0063149 A1* 3/2008 West .................. H04L 41/5087 379/1.03

* cited by examiner

| Advertising Channel | No Conversation | Non-English | Non-Product or Service | New Business | Follow-Up |
|---|---|---|---|---|---|
| Channel A | 13% | 6% | 14% | 30% | 37% |
| Channel B | 11% | 9% | 20% | 15% | 45% |
| Channel C | 42% | 14% | 42% | 1% | 1% |
| Channel D | 2% | 75% | 14% | 5% | 4% |

*FIG. 6*

SYSTEM AND METHOD FOR ANALYZING AND CLASSIFYING CALLS WITHOUT TRANSCRIPTION

CROSS-REFERENCE TO RELATED APPLICATIONS

This application is a continuation of U.S. patent application Ser. No. 13/842,769, entitled "SYSTEM AND METHOD FOR ANALYZING AND CLASSIFYING CALLS WITHOUT TRANSCRIPTION," filed Mar. 15, 2013, the contents of which are hereby incorporated by reference in its entirety.

BACKGROUND

Businesses in industries such as financial services, insurance, travel and hospitality, retail, cable and satellite television rely on voice contact with customers to answer client inquiries, make sales, and provide technical support. A greater utilization of smart phones and advanced mobile devices by customers has resulted in an increasing number of voice calls to such businesses. For such businesses, every contact with a customer is an opportunity to make a lasting impression, to gather customer data, or to strengthen a customer's loyalty to the business. With regard to customer calls, it is desirable to know whether customers are receiving quality customer service that includes accurate information, adherence to professional communication standards, and the conveyance of a feeling of being valued by the business.

One reporting tool used by businesses to track and analyze voice transactions is call recordation, with or without transcription. By listening to recorded customer calls (in their entirety or in samples), or reviewing the transcripts of recorded customer calls, businesses hope to gain insight from conversations with real customers. However, the recording of calls incurs several problems and disadvantages, such as agent and/or caller objections, legal and privacy concerns, and the need for expensive and specialized equipment.

Another technique which businesses utilize to evaluate calls and boost advertising performance is known as call mining or keyword spotting. In call mining, businesses identify key words and phrases to be tracked in every call (e.g., "credit card," "appointment," "thank you," "sale") so as to determine which calls were converted into sales or appointments, and caller intent, needs and pain points. The details of the calls can be accessed as needed by reading call transcripts and then listening to call recordings for granular details on specific calls.

While the aim of call mining is to find successful outcomes and conversions, call mining is based on the words spoken in the call, acquired in either a manual or automated fashion. Every call must generally be recorded, which can be costly or prohibited for various reasons. In some cases, a transcript can be inaccurate because it was transcribed with bad audio quality. At times, the vocabulary of the conversation can be foreign to a transcriber. Even when a set of vocabulary is provided or defined for a transcription broker, the results can still be unusable. Other schemes to analyze call outcomes such as live monitoring can also involve additional costs and drawbacks.

Thus, there is a need for an improved system and method that can automate the analysis of call outcomes without requiring either recording or transcription.

BRIEF DESCRIPTION OF THE DRAWINGS

FIG. 6 depicts a representative table that enables a user to monitor aggregated call classification on a per-advertising channel basis.

DETAILED DESCRIPTION

A method and facility that analyzes audio from a telephone call, without transcribing the call, and develops a characterization of the call is disclosed. The facility analyzes individual frames of audio to identify speech and measure the amount of time spent in speech for each channel (e.g., caller channel, agent channel). In addition to analyzing the audio, the facility evaluates and measures network latency and telephony metrics such as R-factor and MOS score to be factored in as audio analysis inputs. The facility then stitches the individual frames together to generate a clustered-frame representation of the call. The clustered-frame representation is used to characterize on a macroscopic level what is happening over the entire conversation and thereby classify the call.

The facility formulates a clustered-frame representation of the conversation to characterize the exchange and identify dialogue patterns. The clustered-frame representation may be numerical or graphical in nature. The clustered-frame representation is pattern-matched with model cases of certain categories of calls in order to identify a category of call that is closest to the analyzed conversation. Once the facility has classified a call, the classification is stored in association with the call. The facility uses stored classification data to generate aggregate reports of calls segmented by source, geography, time, business or other factor.

The correlation of dialogue patterns to call classification may be utilized to develop targeted solutions for parties seeking to quickly, and in an automated fashion, assess performance across a large corpus of calls without resorting to transcription of the calls. For example, the call classification may be used to assess advertising effectiveness, and in particular to evaluate the performance of different channels of advertisements to help optimize advertising spend by businesses.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
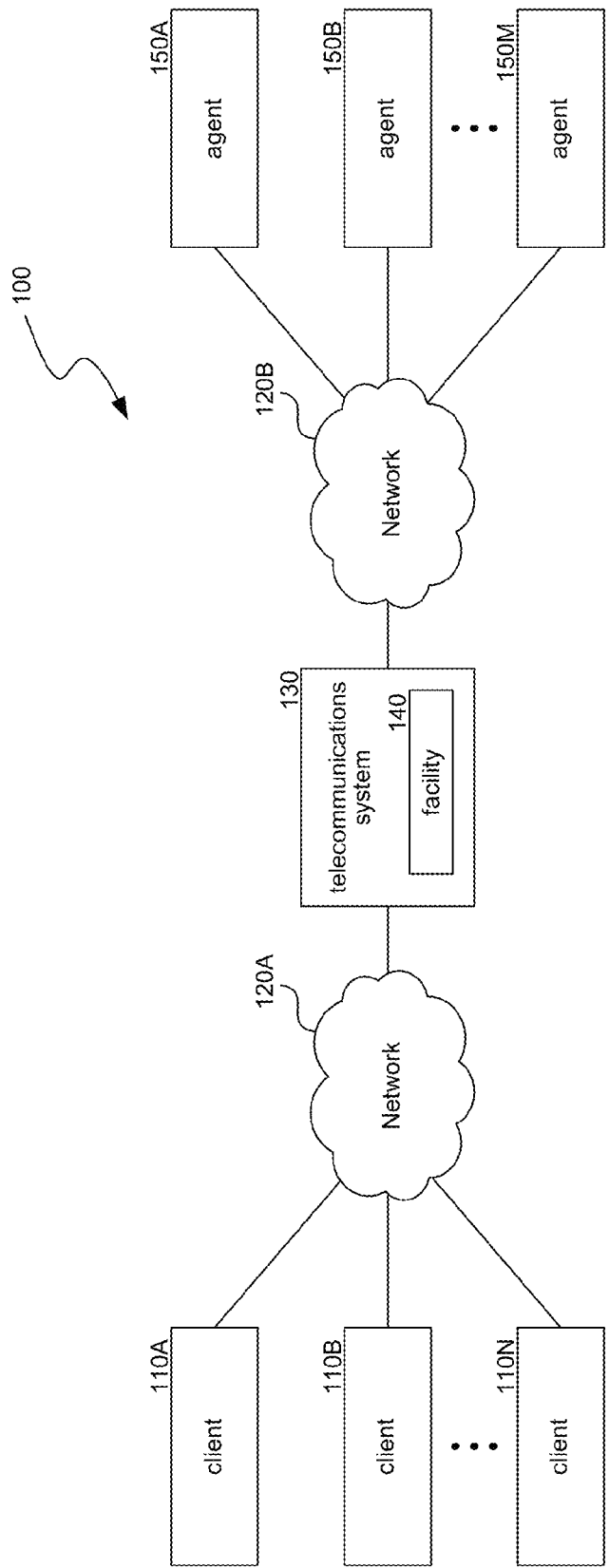
FIG. 1 is an example block diagram illustrating a representative environment in which a system for analyzing and classifying calls without transcription may operate.

FIG. 1 depicts a block diagram illustrating a representative environment 100 in which a facility 140 for analyzing and determining call classification without transcription may operate. In FIG. 1, the environment 100 includes a plurality of clients 110A-110N (e.g., "callers"), network portions 120A and 120B, a telecommunications system 130, and a plurality of agents 150A-150M. The clients 110A-110N are coupled via the network portion 120A to the telecommunications system 130, which in turn is coupled through the network portion 120B to the plurality of agents 150A-150M. As will be described in more detail below, the telecommunications system 130 includes a facility 140 for analyzing and classifying telephone calls.

The plurality of clients 110A-110N may include individual people, businesses, governmental agencies, or any other entities capable of initiating or receiving telephone calls. The plurality of agents 150A-150M similarly may include individual people, businesses, governmental agencies, or any other entities capable of initiating or receiving telephone calls. The telecommunications system 130 may include any system and/or device, and/or any combination of devices/systems that connects or routes telephone calls to and from clients 110A-110N and agents 150A-150M via network portions 120A and 120B. The network portions 120A-120B may include any public or private network, or any collection of distinct networks operating wholly or partially in conjunction to provide connectivity between the telecommunications system 130 and the clients 110A-110N and agents 150A-150M and may appear as one or more networks to the serviced parties, systems, and/or devices.

The network portions 120A-120B may include, but are not limited to, a Voice over Internet Protocol (VoIP) network, a cellular telecommunications network, a public-switched telephone network (PSTN), any combination of these networks, or any other suitable network that can carry telecommunications. In one embodiment, communications over the network portions 120A and 120B may be achieved by a secure communications protocol, such as secure sockets layer (SSL), or transport layer security (TLS). In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The telecommunications system 130 is able to connect or route telephone calls between clients 110A-110N and agents 150A-150M via the network portions 120A and 120B. The telecommunications system 130 implements a software, firmware, and/or hardware facility 140 for analyzing and classifying telephone calls without the use of transcription. As described in more detail herein, the facility 140 analyzes individual frames of audio from a telephone call to determine the presence of speech on each channel and to measure the amount of time that speech is present. The facility 140 stitches the individual frames together to analyze the conversation as a whole and then depicts the interaction of the channels as a clustered-frame representation that is used to further characterize the call. In one embodiment, the clustered-frame representation is presented in a graphical picture depicting who is speaking (i.e., what channel) and for what period of time, as a function of time and for the entirety of a telephone call (or a portion thereof). Based on the data in the clustered-frame representation, the facility 140 classifies the call.

In some embodiments, the facility 140 strives to identify calls with less successful or poor outcomes (i.e., "low-quality calls"). Low-quality calls at times may be easier to identify than calls with preferred outcomes (i.e., "high quality calls"). Some examples of easily identified dialogue patterns that arise in low-quality calls include relatively short client time-in-speech or only brief utterances, indicating indifference or aloofness from the client. Another example includes overwhelmingly long utterances on the agent side, indicating recitation of customary responses or a reading of terms and conditions. Poor audio quality (i.e., bad media) can also interfere with the dialogue and translate to low-quality calls. Once the low-quality calls are identified, they may be analyzed to discover and remedy problems originating from or caused by the agent side.

In some embodiments, the facility 140 determines the density of low-quality calls. In such instances, the facility 140 correlates the density of low-quality calls with parameters such as time, distribution, advertiser, or circuit. In a further embodiment, the facility 140 may provide alerts to operators or other entities regarding the presence of low quality calls.

Figure 2:
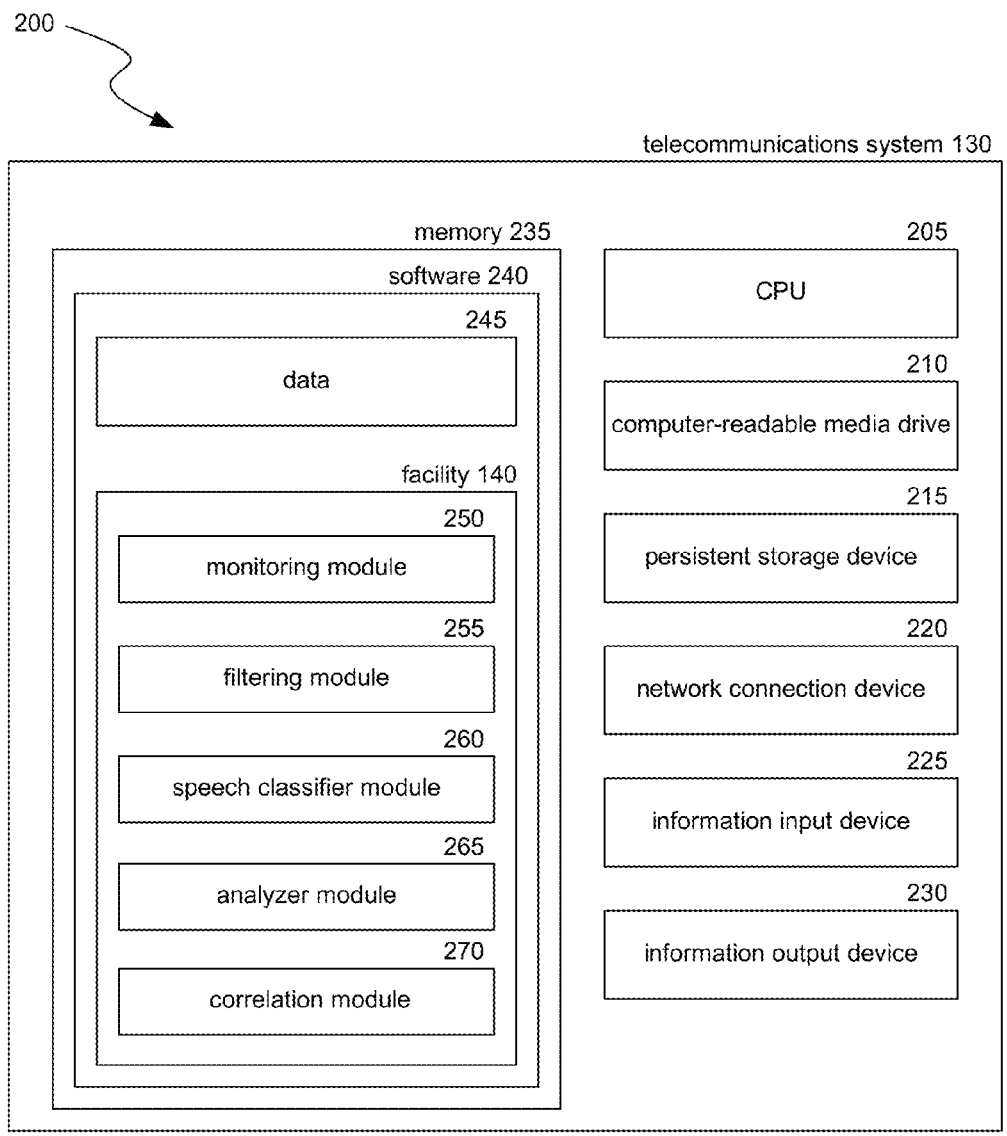
FIG. 2 is an example block diagram illustrating the elements of the system of FIG. 1 in more detail.

FIG. 2 depicts an example block diagram 200 illustrating the telecommunications system 130 and facility 140 of FIG. 1 in more detail. As shown in FIG. 2, the telecommunication system 130 includes one or more central processing units (CPU) 205 for executing software 240, a computer-readable media drive 210 for reading information or installing software 240 from tangible computer-readable storage media (e.g., CD-ROM, a DVD, a USB flash drive and/or other tangible computer readable storage media), a network connection device 220 for connecting to a network, an information input device 225 (e.g., mouse, keyboard), an information output device 230 (e.g., display), and a memory 235.

The memory 235 stores software 240, which incorporates the facility 140 and data 245 used by the facility 140. The data 245 may be partially or wholly stored within the telecommunications system 130. In some embodiments, the data 245 may reside externally and may be communicatively coupled to the facility 140. The facility 140 performs certain methods or functions described herein, and may include components, subcomponents, or other logical entities that assist with or enable the performance of some or all of these methods or functions. In the embodiment of FIG. 2, the facility 140 is shown to include a monitoring module 250, a filtering module 255, a speech classifier module 260, an analyzer module 265, and a correlation module 270, each of which will be described in more detail below.

The monitoring module 250 may comprise any combination of software agents and/or hardware components able to receive and process audio analysis inputs without transcribing, recording, or saving to disk. The monitoring module 250 streams audio of a telephone call. In some instances, the streaming audio is captured in real-time (live) or near real-time, as the telephone call is in progress. In other instances, the monitoring module 250 may receive pre-recorded audio files for analysis. Those skilled in the art will recognize that other forms of audio or acoustic data not otherwise detailed herein may be streamed and/or received by the monitoring module 250. In some embodiments, the monitoring module 250 may utilize or adapt a call processing technology such as Asterisk™.

The monitoring module 250 may also receive and process additional audio measurements. Examples include, but are not limited to, call metadata such as a time and/or length of a telephone call and identity of an advertiser, distribution, campaign, or circuit information. Other additional audio analysis inputs include network latency measurements and media metadata such R-Factor and MOS scores from tools such as Empirix™. These inputs indicate whether the parties are able to hear each other on a line and can also signify a cause of quality issues (e.g., problems with a circuit).

The filtering module 255 may be any combination of software agents and/or hardware components able to apply at least one electronic filter to the audio of a telephone call so as to pass desired signals and/or attenuate unwanted signals. In one embodiment, the filtering module 255 may apply a low-pass filter that eliminates high-frequency signals such as "pops" and "shrieks." In a further or alternative embodiment, the filtering module may apply a high-pass filter to eliminate background noise in the audio signal. Those skilled in the art will appreciate that one or more filters may be applied to "clean-up" the audio stream so that the audio may be more effectively analyzed.

The speech classifier module 260 may be any combination of software agents and/or hardware components that determine the presence and duration of speech or other features of a call in a given audio stream or on a given channel in the stream. In some embodiments, the speech classifier module 260 may utilize or adapt an open-source transcription technology called Sphinx™.

In one embodiment, the speech classifier module 260 evaluates individual frames of audio (e.g., approximately every 3 milliseconds for 11.025 kHz audio stream). For example, the speech classifier module 260 determines for each frame whether a standard of what is considered speech is met or classifies speech on a binary basis (i.e., yes or no). The speech classifier module also determines when and for how long there is no speech (i.e., pauses, silences) and overlapping speech (e.g., more than one channel has speech). One channel's time-in-speech therefore includes an account of whether there is speech or no speech, when there is speech or no speech, and for how long there is speech or no speech. As an example scenario of a telephone call consisting of two parties (i.e., a client channel and an agent channel), the speech classifier module 260 may determine, as a function of time, whether, when, and for how long there was speech or no speech on the client channel and whether, when, and for how long there was speech or no speech on the agent channel.

In addition, the speech classifier module 260 determines for each frame whether a standard is met corresponding to various additional features of the call, including without limitation ring tones, silence, dual-tone multi-frequency (DTMF), music (as opposed to conversational speech), speaker gender, speaker language (e.g., English, Spanish, German, etc.), and stress or emotion in the voice pattern of the speaker. The speech classifier module also determines when and for how long each feature is present and the existence of overlapping features. One channel's time-in-speech therefore includes an account of whether certain features are present in the call, when each feature is or is not present, and for how long each feature is or is not present.

As an example scenario of a telephone call consisting of two parties, the speech classifier module 260 may determine, as a function of time, whether, when, and for how long there was music being played on the agent channel and whether, when, and for how long there was stress or emotion present in the voice pattern on the client channel. The speech classifier module 260 also may group together certain call features by monitoring the start times and stop times of each respective call feature.

In some embodiments, the telephone call consists of more than two parties, such as when the client is transferred to another agent or becomes a part of a teleconference with multiple agents. The speech classifier module 260 would therefore account for and distinguish between the multiple channels and chronicles the time-in-speech of each additional party. In some embodiments, a party (e.g., client or agent) does not engage with a human agent on the other side of the line. For example, the client may, through key tones or voice commands, interact with an interactive voice response (IVR) or is put on hold with a pre-recorded message or music. In such an instance, the speech classifier module 260 may determine the time-in-speech of any audio signals emanating from the agent channel, such as the IVR and pre-recorded message or music.

The analyzer module 265 may be any combination of software agents and/or hardware components able to depict the time-in-speech for each channel of the audio as a visual representation and analyze the visual representation as a whole. The analyzer module 265 characterizes individual frames of audio and in some instances, stitches them together to more accurately represent what is happening for the entire telephone conversation or a portion thereof. For example, the analyzer module 265 may depict each party (i.e., channel) in a two-person conversation for the entirety of the telephone call as a two-state (e.g., high/low, on/off, speech/no speech) square waveform, with each channel being a different color and the width of a square wave specifying the duration of the represented state. The analyzer module 265 can further ascertain various metrics from the audio such as network latency measurements and media metadata (e.g., R-Factor, MOS scores) as well as the total time-in-speech by each party, a rate of interchange, continuous segments of speech ("talkspurt"), length of pause(s), hold times, response times, and other measurements.

In some embodiments, the analyzer module 265 processes the audio as a sliding window with buffering such that continuous frames of speech are captured. In turn, a cluster of frames where speech is continuously present on one channel would be joined together and graphically depicted as such. For example, an entire sentence spoken by one party without pause can be represented as a single high-state square wave.

Once a clustered-frame representation is formulated, the analyzer module 265 can evaluate the interaction between the two channels for a given period of time. For example, the analyzer module 265 may detect a region in the clustered-frame representation where only one channel is active for a period of time and characterize it as a "caller monologue." Similarly, if the graphical waveforms are flipping quickly between channels, the analyzer module 265 may indicate the portion as a "conversation." If the graphical waveforms are overlapping, this would likely signify that two parties are talking at once and signifies a "collision." The analyzer module 265 may output a "call silent" should it detect both channels are silent for a given period of time. Those skilled in the art will recognize that other interactions not otherwise detailed herein may be ascertained by the analyzer module 265. Recurring instances of certain interactions can indicate a pattern or profile, whereby the analyzer module can catalog and intelligently identify common patterns.

The correlation module 270 correlates a certain telephone call interaction, profile, or pattern to a specific outcome and uses this correlation to classify the call. The correlation module 270 compares the clustered-frame representation of a call to various call patterns that are associated with certain outcomes, results or qualities. As an example, a pattern of repeated instances of lengthy telephone calls having short client time-in-speech can indicate that clients searching for a particular business enter a directory assistance distribution, but are then connected to an incorrect phone number. As will be described in additional detail herein, the correlation module 270 finds matching patterns and classifies each call. The call classification may be used by the facility to assess the performance of certain channels through which the calls were received.

Those skilled in the art will appreciate that the telecommunications system 130 and facility 140 may be implemented on any computing system or device. Suitable computing systems or devices include personal computers, server computers, hand-held or laptop devices, multiprocessor systems, microprocessor-based systems, programmable client electronics, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

It will also be appreciated that the telecommunications system 130 includes multiple elements coupled to one another and each element is illustrated as being individual and distinct. However, in some embodiments, some or all of the components and functions represented by each of the elements can be combined in any convenient and/or known manner or divided over multiple components and/or processing units. For example, the elements of the telecommunications system 130 may be implemented on a single computer, multiple computers, and/or in a distributed fashion. As another example, elements 140 and 245, or portions thereof, may be stored in memory, may reside externally and/or be transferred between memory 235 and a persistent storage device 215 (e.g., hard drive) for purposes of memory management, data integrity, and/or other purposes. Furthermore, the functions represented by the components can be implemented individually or in any combination thereof, in hardware, software, or a combination of hardware and software. Different and additional hardware modules and/or software agents may be included in the telecommunications system 130 without deviating from the spirit of the disclosure.

Figure 3:
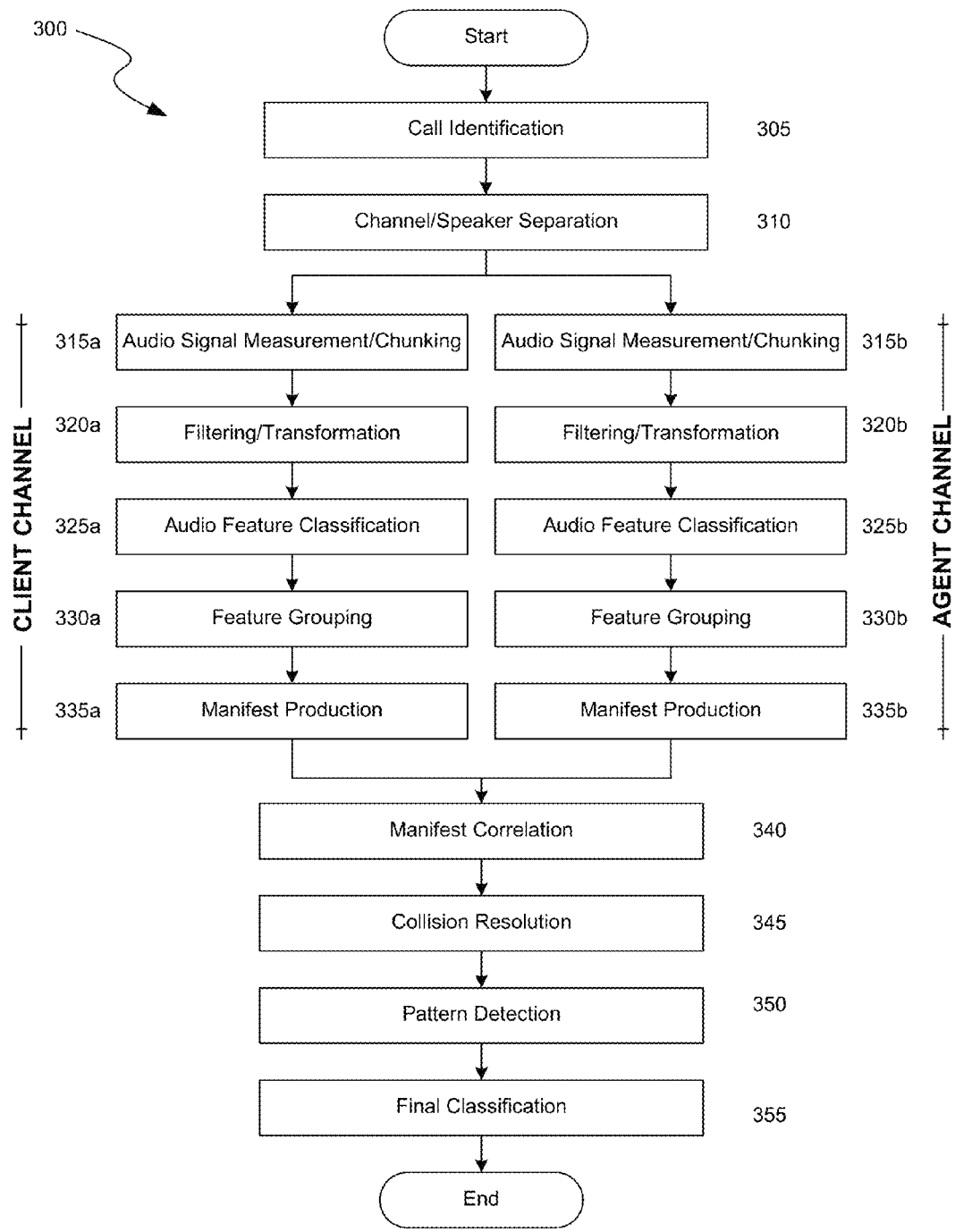
FIG. 3 is a flow diagram illustrating a process implemented by the system of FIG. 1 in connection with analyzing and classifying calls without transcription.

FIG. 3 depicts a flow diagram illustrating a process 300 implemented by the facility 140 in connection with analyzing and classifying calls without transcription. Those skilled in the art will appreciate that the depicted flow diagram may be altered in a variety of ways. For example, the order of the steps may be rearranged, steps may be performed in parallel, steps may be omitted, or other steps may be included.

The process 300 begins at a block 305, where the facility identifies one or more telephone calls to analyze as well as any corresponding parameters or metadata of the telephone call(s). Example parameters and metadata include, but are not limited to, the telephone number on the client-side 110 and/or on the agent-side 150, client ID, agent ID, date and time of call, call duration, number of parties on the line, etc. Because the call can originate from either a client or an agent, the facility 140 may use caller identification technology to identify the telephone numbers of the parties to the telephone call. The facility 140 may further use, for example, call routing information to determine an account identifier, a forwarding telephone number, or other identifier.

At a block 310, the facility receives audio of a telephone call, without transcribing the call. In some embodiments, the facility monitors the audio signals of a live call and analyzes the audio of the call as the call is occurring. Alternatively, the facility may receive pre-recorded audio signals of calls and analyze the pre-recorded data. The facility, in some instances, may first determine a mode of operation (e.g., monitor, retrieving recorded files for audio analysis), call out to a monitoring service to set-up the audio streaming, point a modified monitor application to named pipes, and forward the streamed audio to the monitor service for analysis.

At a block 310, the facility separates the telephone call into two channels. A first channel corresponds to the client side 110 of the telephone call and a second channel corresponds to an agent side 150 of the telephone call. By separating the telephone call into two channels, the facility is able to more effectively analyze the call to classify and group call features, and create a manifest for each channel, as described in more detail below.

At blocks 315a-315b, the audio signal for each respective channel (i.e., client channel 315a and agent channel 315b) is measured and broken into a plurality of data segments. The channel measurements may include, but are not limited to, network latency, R-Factor, MOS scores, excessive delay, echoing, and momentary audio interruptions. The signal is broken into segments to allow CPU 205 to process the audio data more quickly and efficiently.

At blocks 320a-320b, the facility applies filtering and transformation techniques to the audio in real time or near real time for each respective channel (i.e., client channel 320a and agent channel 320b). In one embodiment, the facility in real time or near real time applies a signal filter to eliminate unwanted signals in the audio signal. Filtering options include, but are not limited to a high-pass, low-pass, notch, or band-pass filter. For example, a high-pass filter may be applied to remove any low frequency rumbles, unwanted vocal plosives or DC offsets. Those skilled in the art will recognize that high-pass filters may also be applied for other reasons, such as reducing the influence of background noise in order to improve speech recognition and the robustness of a connected-words recognizer. A low-pass filter may be applied in an effort to eliminate or minimize offending treble shrieks or general ambient background noise. A band-stop filter may be applied to remove recurring or cyclical noise such as a hum of 60 Hertz. In addition, the facility may used advanced signal processing algorithms such as, but not limited to, the Fast Fourier Transform (FFT), to examine a representation of the audio in a basis other than the time domain.

At blocks 325a-325b, the facility runs a time-in-speech classifier on individual frames of audio for each channel (i.e., client channel 325a and agent channel 325b). The facility determines the presence and duration of speech and other call features and no speech or other call features in a given audio signal or on a given channel in the signal. In one embodiment, the facility evaluates individual frames of audio (e.g., milliseconds of data) on each channel and classifies speech and other call features on a binary basis (e.g., yes or no). In some instances, a threshold is established to determine whether the signal meets the standard of what is considered speech or a call feature. As an example, for a two-party (i.e., two-channel) telephone call that lasts for ten minutes, the facility may determine there is a ring tone for 30 seconds, music on the agent channel for ninety seconds, no speech on either channel for thirty seconds, speech on the client channel for five minutes, speech on both the agent and the client channel for thirty seconds, speech on the agent channel for ninety seconds, followed by a thirty-second segment of speech on the client channel.

At blocks 330a-330b, the speech and other call features are assembled into groups for each channel (i.e., client channel 330a and agent channel 330b). The facility may group speech and other call features by monitoring the start and stop times for each respective speech or call feature. By grouping the speech and call features, the facility allows a particular speech or call feature to more easily be distinguished from another speech or call feature.

At blocks 335a-335b, the facility characterizes the audio of each channel to form a clustered-frame representation or manifest for each channel (i.e., client channel 335a and agent channel 335b). In some embodiments, the facility visually depicts the clustered-frame representation in a graphical display that allows a user to visually interpret the features of the call. The facility may characterize each channel of the telephone call as a saw-tooth or a square waveform. The facility may also graphically characterize each channel of the telephone call as a series of blocks of different colors, shapes, or patterns corresponding to various call features associated with the telephone call. For example, the clustered-frame representation creates a picture or snapshot of who (i.e., what specific channel) is speaking and for what period of time. The clustered-frame representation may represent the entirety of the telephone call or a portion thereof. In some instances, the clustered-frame representation captures one or more parties in a telephone call and/or one or more telephone calls. For example, a number of telephone calls may be visually mapped to determine a distribution or a pattern. Those skilled in the art will appreciate that the audio of each channel may be visually represented in other formats, portions, or in other quantities not otherwise detailed herein.

At block 340, the clustered-frame representation or manifests for each channel are correlated by the facility 140 such that the visual representation of the client channel and the visual representation of the agent channel are presented together in one representation that depicts both channels simultaneously. The two channels may be correlated by a variety of different means, including syncing a start time for the client channel with a start time for the agent channel, by relying on embedded or captured time stamps at various points in the audio, etc.

At block 345, the facility 140 resolves collisions between the two channels, or between conflicting features on a single channel. A collision may occur when two or more features are detected at the same time such that the detected features overlap. A collision resolution module resolves the collision by determining one or more boundaries of each respective feature and assigning non-overlapping start and stop times to the overlapping features in order to eliminate the collision. For example, the facility 140 may detect a ring feature and a speech feature, where the end portion of the ring feature overlaps with the beginning portion of the speech feature. In such case, a collision exists with respect to the overlapping portion where both the ring feature and the speech feature are simultaneously detected (i.e., the end portion of the ring feature and the beginning portion of the speech feature). The collision resolution module may resolve the collision by assigning a stop time to the ring feature and a non-overlapping start time to the speech feature. As a result, both the end of the ring feature and the beginning of the speech feature are clearly delimited and the overlap condition is resolved. Additionally or alternatively, the collision resolution module may eliminate an overlap condition by shifting the timescale of one or more overlapping features. For example, the collision resolution module may shift the ring feature by 15-20 milliseconds to an earlier time to resolve a collision with the speech feature.

At a block 350, the facility analyzes the clustered-frame representation to detect one or more patterns within the call. While FIG. 3 depicts the blocks 350-355 in series, those skilled in the art will appreciate that the steps may be rearranged or performed in parallel. In one embodiment, the facility can interpret what is specifically happening during a telephone call and in what part of the conversation activity is taking place and use the interpretation to supplement the clustered-frame representation. That is, portions of the clustered-frame representation may be characterized as having a certain pattern. The facility can identify over the course of the conversation how the parties are behaving and when they behave the way they do. In turn, the facility can analyze these interactions, begin to track certain behaviors, and identify recurring instances or patterns of dialogue or profiles.

For example, the facility may evaluate the interaction (e.g., absence, presence, degree, amount of) between the channels (i.e., parties) of the telephone call. The facility analyzes the rate of back-and-forth time-in-speech (i.e., "rate of interchange") between the parties, the extent of overlapping time-in-speech, continuous segments of speech (i.e. "talkspurt") between silent intervals (e.g., only background noise), and other characteristics/patterns of speech or conversations. As previously discussed, a segment of caller monologue, collision, conversation, call silence etc. may also be noteworthy to the facility. In addition to the presence of speech, the absence of speech such as pauses and silences may be observed and measured. For example, the facility may analyze the length of a pause in one party's speech between sentences, between words or syllables, the length of a pause intervening between two periods of speech by one party, the length of an interval between the beginning of a pause as heard by the listener and the beginning of a reply, and the like. Those skilled in the art will appreciate that the pitch, stress, intonation, volume, and other characteristics of speech may also be accounted for by the facility.

As another example, the facility may determine in what portion of the entire telephone call the activity or interaction (or lack thereof) between the channels occurs. For example, a period of back-and-forth between parties at the beginning of a call typically reflects a different interaction than a period of back-and-forth at the end of a call. Similarly, an extended time-in-speech on the agent channel at the beginning of a call typically indicates a different sort of communication than at the end of a call. By classifying when an activity occurs during the telephone call, the facility is better able to analyze the parties' behavior on the call.

The facility may also identify patterns of dialogue. The facility is able to identify and classify common patterns of channel interaction based at least in part on the time-in-speech of the channels and what part of the call the interaction occurs. For example, a relatively greater amount of time-in-speech on the agent-channel in the first third of a call tends to indicate that the client is navigating through an interactive voice response (IVR). As another example, a relatively greater amount of time-in-speech on the agent side in the middle of a call tends to indicate the reading of terms and conditions or a description of products and services. Certain example channel interaction patterns will be described in more detail below with respect to FIGS. 4A-4D.

At block 355, the facility 140 analyzes the clustered-frame representations, including characterized portions of the clustered-frame representations, to arrive at a final classification reflecting the call being analyzed. For example, call classification may be analyzed into a series of top-level categories, including without limitation the following: No Conversation; Non-English; Non-Product or Service; New Business; or Follow-up. The facility may apply a variety of techniques to the detected patterns to arrive at a top-level category regarding call classification.

In some embodiments, the system determines the classification of a call by storing a set of model clustered-frame representations that each corresponds to a known instance of a top-level category or subcategory call. In other words, the facility stores a set of model cases that are each representative of a particular call classification category or subcategory. The facility uses the model cases to identify a match for the current call within the model cases. If the current call strongly matches a model case, then the facility assigns the same or similar category or subcategory associated with the model case to the current call. However, if the current call provides only a moderate match or a weak match to the model case, the facility may compare the current call to a number of other model cases in order to find a better match.

In some embodiments, the facility may derive a prediction model for call classification by evaluating pre-determined outcomes for a corpus of manually-scored calls (i.e., a training set) and deriving a corpus-specific predictive model for one or more call classifications. To perform the analysis of the training set and generate a predictive model, the facility may use machine learning algorithms including, but not limited to, logistic regression, support vector machines, or neural networks. Different predictive models may be built by the facility to handle different groups of calls. For example, a predictive model may be built for a particular industry vertical (e.g., insurance, travel), for a particular type of call (e.g., customer service, procurement), for a particular company, or for any other arbitrary group of calls.

For example, when analyzing a current call, the facility may first attempt to determine whether the current call is a "wrong number" call by comparing the clustered-frame representation of the current call with the clustered-frame representation of the model case (or model cases). The facility retrieves a known clustered-frame representation for a model "wrong number" call that strongly indicates a wrong number. As discussed in more detail herein, a clustered-frame representation of the model wrong number call may reflect a short overall duration (e.g., less than 30 seconds) with very brief interactions between a client and an agent. When determining whether the current call is a wrong number, the facility determines whether the current call also has a short duration and whether the current call also has brief interactions between a caller and an agent. The facility may then assign a score that represents the strength of the match. For example, if the current call had a moderately long duration rather than a short duration, and moderately long interactions between the agent and the client rather than short interactions, the facility may assign a wrong number score of 0.6 (where 1.0 represents a perfect match), thereby indicating that the current call is not a strong match for a wrong number.

The facility may then return a determination that the current call is a wrong number and stop processing, or the facility may continue to compare the clustered-frame representation of the current call to model clustered-frame representations in order to see if a better match may be found. A person of ordinary skill in the art will recognize that the facility may compare the clustered-frame representation of the current call being analyzed to a model clustered-frame representation for all or fewer than all known call classification types. In addition, a person of ordinary skill will recognize that the facility may return one or more probabilities if the facility cannot determine a single call type (e.g., the facility may indicate that the current call has a 54 percent probability of being a call of Category A and a 46 percent probability of being a call of Category B).

As another example, the facility may classify the call as "No Conversation" if the facility determines that the call does not contain two humans that are talking to each other. Speech on only a single channel or detection of a synthesized voice may be indicative of a lack of conversation. The facility may classify the call as "Non-English" if it detects that the client primarily spoke a Non-English language during the call, such as Portuguese or French. Such determination may be assessed, for example, rates of speech, intonation, and various speech patterns without having to rely upon transcription.

In arriving at a final classification reflecting the call being analyzed, the facility 140 may also determine subcategories of the top-level categories. For example, the top-level category for "No Conversation" may be associated with subcategories including without limitation the following: faxes; robocalls; technical errors, voicemail hang-ups; voicemail messages; misclassified calls; calls having no connection; and voicemail or phone tree hang-ups. The top-level category for Non-Product or Service may be associated with subcategories including without limitation the following: wrong numbers; misclassified calls; calls for which the intent is unclear; miscellaneous calls; and calls that otherwise can only be classified as strange or weird. The top-level category for New Business may be associated with subcategories including without limitation the following: complaints; calls requiring follow-up; misclassified calls; calls resulting in sales; calls regarding services not offered; calls regarding hours, directions, or inventory; inquiries; and miscellaneous calls. Similarly, the top-level category for Follow-Up may be associated with subcategories including without limitation the following: complaints; calls requiring follow-up; misclassified calls; calls resulting in sales; calls regarding services not offered; calls regarding hours, directions, or inventory; and miscellaneous calls.

The top-level categories and the subcategories, as well as other information that is identified by the facility, is used by the facility to apply an overall classification to each call that is analyzed.

In some embodiments, the facility identifies and partitions the audio into time periods for analysis and applies a different classification to each time period. The facility, in some instances, divides the clustered-frame representation into a beginning, middle, and end. Here, the facility may account for a variety of factors in determining a beginning, middle and end. The facility may account for factors such as hold-time, call transfers, call duration, an interactive voice response (IVR) tree and the like. In some cases where the entire telephone call is too brief or abridged to characterize a beginning, middle or an end, the facility may classify the entirety of the telephone call as the beginning.

Additional data (besides the audio itself) may be taken into account when performing call classification, such as call and media metadata. Call and media metadata may include, but are not limited to, distribution, advertiser and circuit identifier; start and end time; media source and destination IP; media source and destination port; R Factor, worst instantaneous R Factor, worst instantaneous MOS; packets and bytes received, lost or duplicated; jitter average, minimum and maximum; average burst and gap length and loss rate. In turn, certain of these metrics of audio quality which typically indicate quality of service problems such as excessive delay, echoing, or momentary audio interruptions, may also factor in or indicate a low-quality call.

FIGS. 4A-4D depict channel interaction patterns between a caller channel and an agent channel. Based at least in part on the time-in-speech on each channel and in what part of the call it takes place, the facility can correlate a clustered-frame representation to a type of conversation so as to estimate what has happened and characterize the call. Each of the FIGS. 4A-4D illustrates a clustered-frame representation that depicts, as a function of time, a conversation between two parties (i.e., channels) at different stages of a telephone call, wherein each party is identified by a different level (i.e., height) and registers a different logical state when speech is detected. Each of the clustered-frame representations does not capture the entire telephone call, but focuses only on the interaction that occurs at a portion (e.g., beginning, middle, or end) of a call.

Figure 4A:
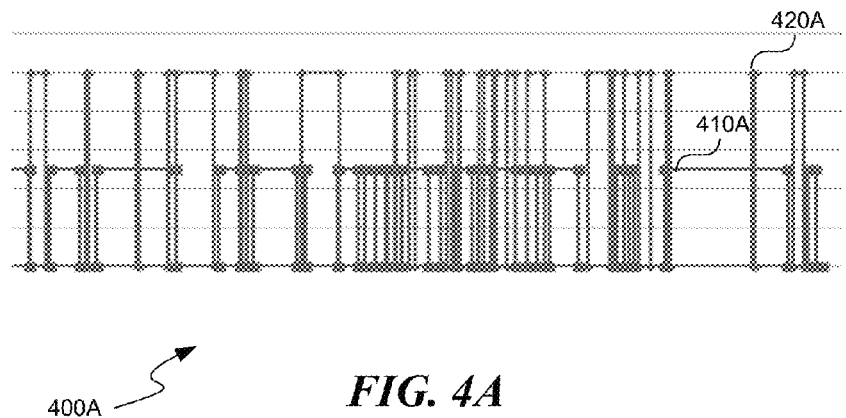
FIGS. 4A-4D depict patterns of channel interaction between a caller channel and an agent channel.

FIG. 4A depicts a clustered-frame representation of an example channel interaction pattern 400A known as a "thrash." In certain implementations, this type of "thrash" pattern 400A typically occurs at the end of a call. The pattern 400A reflects a significant amount of back-and-forth conversation between the agent-channel and the client-channel.

As shown in FIG. 4A, a waveform 410A represents the time-in-speech on the agent channel and a waveform 420A represents the time-in-speech on the client channel. The agent channel waveform 410A shows a longer time-in-speech, which tends to indicate to the facility that the agent is asking questions of the client such as, "Have I answered all of your questions?" or "Were you happy with the service that you received?", "Are you sure?", etc. In contrast, the client channel waveform 420A shows a shorter time-in-speech, as illustrated by the numerous and narrow peaks that are sometimes in rapid succession. The shorter time-in-speech tends to indicate to the facility that there are only short utterances by a client hoping to conclude the call, such as "Yes," "No" or "Can I call you back?"

Figure 4B:
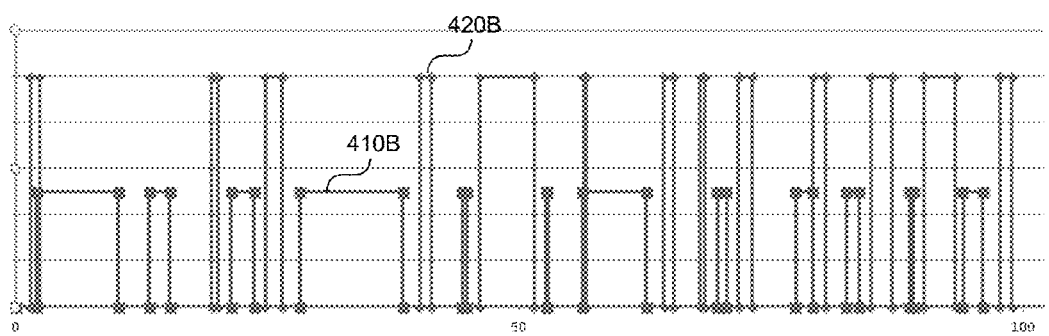

FIG. 4B depicts a clustered-frame representation of an example channel interaction pattern 400B known as an "exchange of personal data." A measure of time 430B (e.g., in milliseconds, seconds, minutes, etc.) is represented along the x-axis. The "exchange of personal data" represented by the pattern 400B typically occurs at the beginning of a call and reflects a lot of back-and forth in time-of-speech between the agent-channel and the client-channel.

In FIG. 4B, a waveform 410B represents the time-in-speech on the agent channel and a waveform 420B represents the time-in-speech on the client channel. The waveform 410B shows a longer time-in-speech, which tends to indicate to the facility that the agent is asking preliminary information identifying the client such as, "With whom am I speaking to," "Can you spell that?", and/or "May I have your order number?" Moreover, the short pauses between the agent's and caller's time-in-speech tend to indicate to the facility that either the client is searching for information and/or that the agent is pulling up, looking for or reviewing information and/or putting the client on hold. The waveform 420B shows a shorter time-in-speech, which tends to indicate to the facility that the client is responding to the agents' preliminary questions.

Figure 4C:
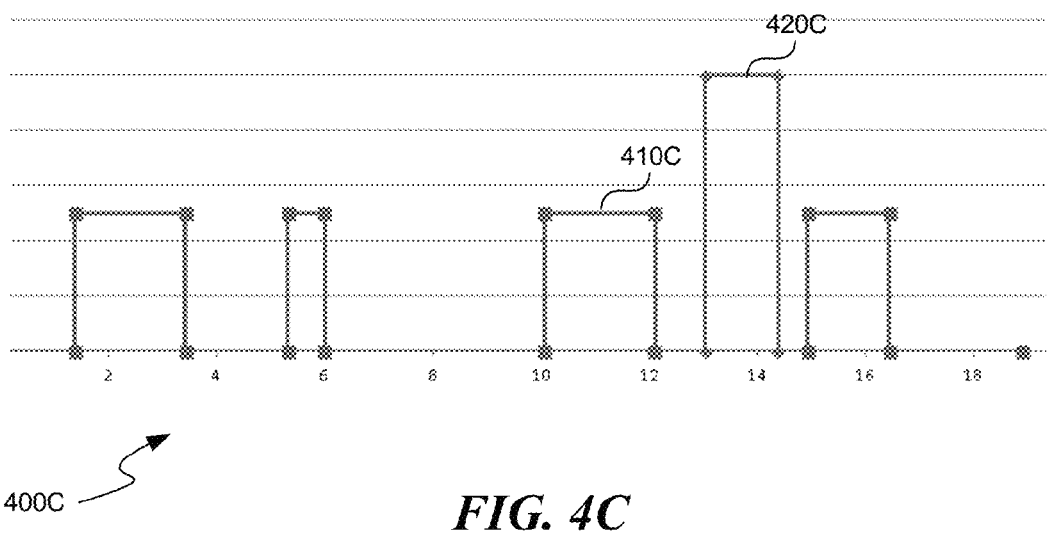

FIG. 4C depicts a clustered-frame representation of an example channel interaction pattern 400C known as a "wrong number." A measure of time 430C (e.g., in milliseconds, seconds, minutes, etc.) is represented along the x-axis. In certain implementations, this type of "wrong number" pattern 400C typically occurs for the entirety of the call or just at the beginning.

As shown in FIG. 4C, a waveform 410C may reflect the time-in-speech on either the client channel or the agent channel in that either the client or the agent may originate the call to a wrong number. Regardless of who initiated the call, the pattern 400C does not reflect a substantial amount of speech and only indicates relatively shorts burst on the caller (client or agent) side. After several short bursts indicated by the waveform 410C (e.g., "Hello?"), a question may be solicited such as "Is this XXX-XXX-XXXX?" with, typically, a singular response from the other party indicated on the waveform 420C, such as "No, you have the wrong number."

The facility may also ascertain other observations depending on whether the originator of the wrong number was an agent or a caller. For example, if the waveform 410C depicts the client time-in-speech and the waveform 420C depicts the agent time-in-speech, as noted above this may indicate that the client dialed, or was otherwise connected to, a wrong number. Such a wrong number connection may further indicate that the client was routed to a wrong number, or a business directory has an incorrect listing, or that a business may have advertised a wrong number, etc. In contrast, if the waveform 410C depicts the agent channel and the waveform 420C depicts the client channel, this may indicate problems on the agent side, such as incorrect or outdated client information, distracted or poor performance on the part of the agent, a faulty routing or directory facility on the agent side, etc.

Figure 4D:
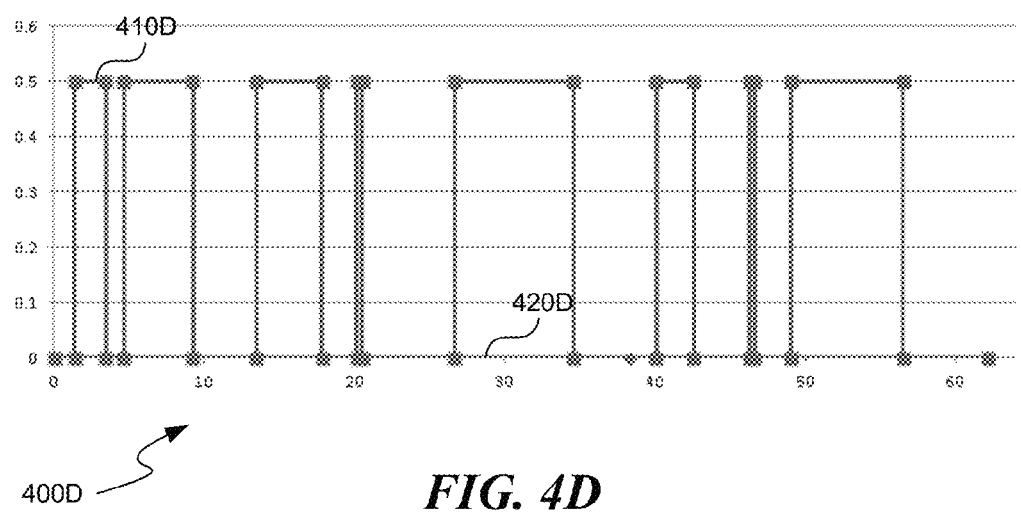

FIG. 4D depicts a clustered-frame representation of an example channel interaction pattern 400D known as "no call activity." The pattern 400D reflects activity that can occur for the entirety of the call or at any point in time. As shown in FIG. 4D, a waveform 410D may reflect the time-in-speech on the client or the agent channel. Regardless of who initiated the call, a waveform 420D reflects an absence of interaction due to no time-in-speech. If the waveform 410D reflects speech/activity on the agent-channel, this may indicate a situation such as a defective interactive voice response (IVR) technology in which no key tones, voice tones or speech from the client are registering with the facility. If waveform 410D reflects speech/activity only on the client-channel, this may indicate a situation in which, for example, the client is a robo-caller giving a pre-recorded message.

Figure 5:
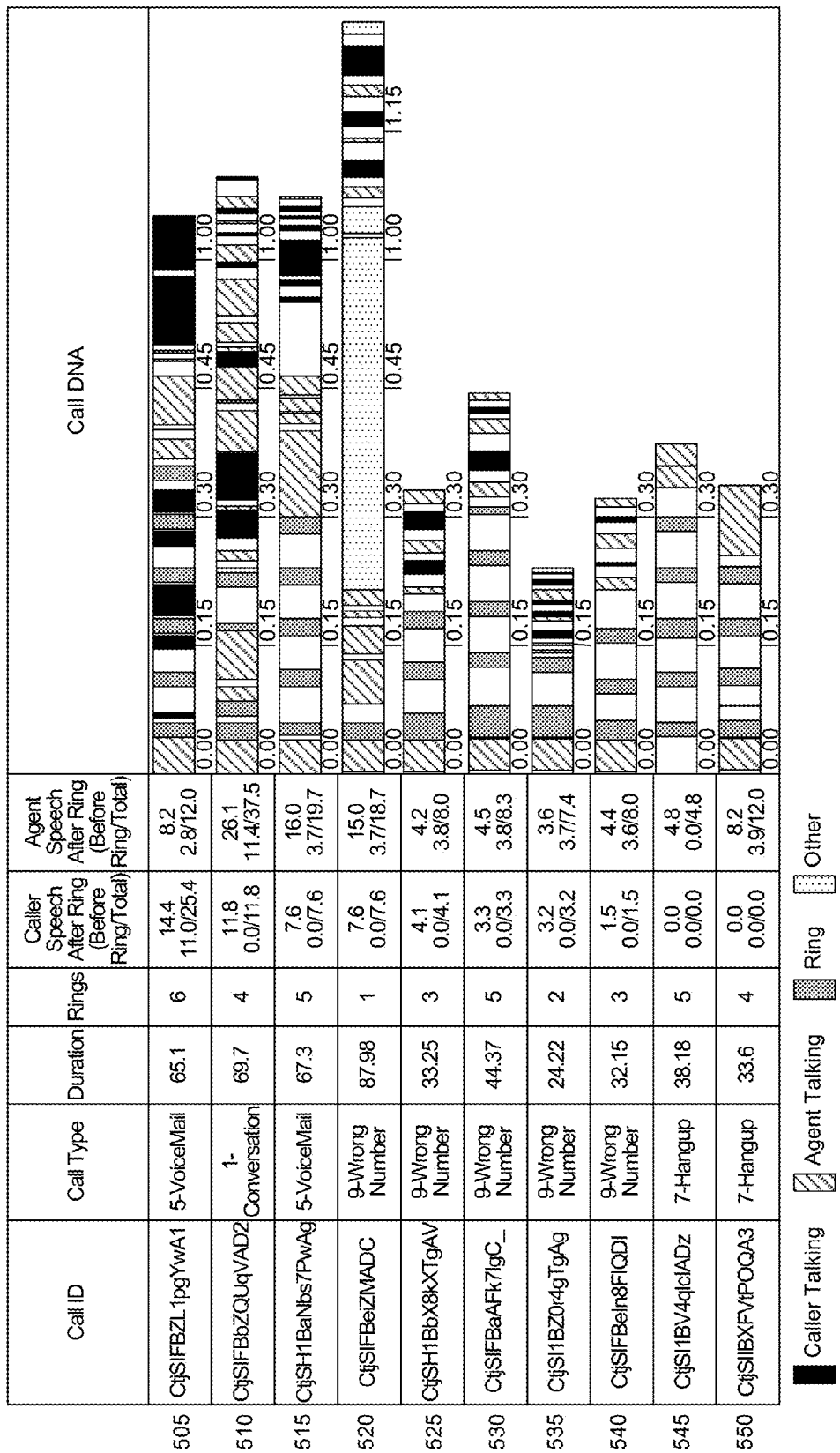
FIG. 5 is a software interface for a user to monitor the characteristics and classification of multiple calls simultaneously.

FIG. 5 is a representative software interface, generated by the facility 140, that is used to display the characteristics and classification of multiple calls simultaneously. For example, rows 505-550 each pertain to a separate call and contains entries in various columns pertaining to the call. The interface includes a "Call ID" column that uniquely identifies each call. The Call ID may be any alphanumeric value that is assigned by the facility 140 that is sufficient to distinguish each call from other calls being analyzed. The interface includes a "Call Type" column that displays the top-level classification category (e.g., New Business), subcategory (e.g., Voicemail), or other indicator of call classification. In addition, the interface includes a "Duration" column displaying the length of the phone call (in minutes, seconds, hours, or any other suitable timescale), a "Rings" column displaying the number of rings before the call was answered, a "Caller Speech" column displaying the amount of time that the caller was engaged in speech during the call (in minutes, seconds, hours, or any other suitable timescale), and an "Agent Speech" column displaying the amount of time that the agent was engaged in speech during the call (in minutes, seconds, hours, or any other suitable timescale).

The interface also includes a "Call DNA" column that graphically depicts various features or patterns of the call in a timescale format. The Call DNA column includes a block for each detected call feature as a function of time. The various call features are assigned blocks that vary in appearance (such as color, shading, or pattern) according to the particular call feature being represented. As a result, the interface of FIG. 5 can be more readily interpreted by a human who views the interface to gather information about the depicted calls. For example, by providing a visual representation of the call, a user of the facility can quickly scan the call to ignore an initial connection portion (e.g., rings, initial back-and-forth between caller and agent) and instead focus on portions of the call that are of interest (e.g., a long stretch of the call where the caller is speaking).

For example, call 520 depicts a call that is classified as a "Wrong Number." The Rings column indicates that call 520 rang five times before it was answered. The Caller Speech and Agent Speech columns indicate that, during the call, the caller spoke for 7.6 seconds and the agent spoke for 15.0 seconds. The Call DNA column for call 520 indicates that the agent spoke during approximately the first 20 seconds of the call, that neither the agent nor the caller spoke from approximately 20 seconds into the call to 65 seconds into the call, and that the agent and the caller had short interactions from approximately 65 seconds into the call through the end of the call. A short interaction between caller and agent is a pattern indicative of a wrong number, thereby allowing the facility to automatically analyze and classify the claim based on the detected pattern.

In addition to classifying individual calls, the facility may display indications of call classification that are aggregated on a per-advertising channel basis. Such a display allows a user to more easily gauge how well or how poorly a particular advertising channel is performing relative to other advertising channels, as well as providing more insight to the user regarding reasons why a particular advertising channel is or is not performing at an optimal level. For example, FIG. 6 depicts a table 600 that enables a user to monitor aggregated call classification on a per-advertising channel basis. Table 600 may be generated by the facility and presented to a user as part of a software interface for monitoring call classification. Table 600 includes an "Advertising Channel" column 605 that displays information sufficient to distinguish each advertising channel from other advertising channels in the table. For example, Channel A may correspond to an online advertising campaign, Channel B to a billboard, Channel C to a certain online keyword-advertising campaign, Channel D to television and radio advertising. Channels may be identified by the use of tracking phone numbers that are used in each of the channels. A person of ordinary skill in the art will appreciate that Advertising Channel column 605 may display a variety of additional advertising channel identifiers, including a location, product, service, or advertising firm associated with the advertising channel.

In addition, table 600 includes one or more columns corresponding to various call classifications (as explained in more detail above), including "No Conversation" column 610, "Non-English" column 615, "Non-Product or Service" column 620, "New Business" column 625, and "Follow-Up" column 630. In each of the call classification columns 610-630, the table 600 includes the percentage of aggregate calls for the corresponding advertising channel that falls into the respective call classification category. For example, advertising channel 650 corresponds to calls received on Channel A. Over a defined time period (such as a period of one week, three months, 90 minutes, etc.), 13 percent of incoming calls resulting from Channel A contained no conversation (column 610), 6 percent of incoming calls contained no conversation in English (column 615), 14% of incoming calls did not relate to products or services offered by the advertiser (column 620), 30% of incoming calls related to new business (column 625), and 37% of incoming calls required follow-up (column 630). Similarly, table 600 depicts similar information for incoming calls to Channel B (in row 652), Channel C (in row 654), and Channel D (in row 656).

Accordingly, table 600 allows the facility or user to perform a quick comparison of multiple advertising channels to identify problems or trends, and to assist in optimizing advertising spend. For example, a user viewing table 600 may identify a problem regarding a relatively large number of calls having no conversation being received via Channel C as compared to other phone numbers. Similarly, the user may identify a particularly successful advertising channel, such as Channel A, which generates a relatively high rate of business generation as compared to other phone numbers. The facility may use the channel performance data to make offline or real-time recommendations or determinations of optimal placements of advertisements. That is, the facility may refocus ads to channels that perform the best according to the publication channel scores.

In addition to using aggregate data of call classification to analyze publication channel, the facility may also segment aggregate classification data in a variety of other ways. For example, the facility may further segment the classification data by caller number. By doing so, the facility is able to detect telephone calls originating from certain callers that reflect an undesirable pattern of behavior (e.g., frequent hang-ups, belligerent behavior). To mitigate such a problem, the call originator may be blacklisted for a certain time period. The blacklisting may result in the caller's call being blocked, deprioritized (e.g., kept on hold for longer periods), or otherwise treated differently than other calls. As another example, the facility may be able to detect those calls that are being initiated by an automatic telephone dialer, a "robodialer," or other call originator that initiates a large number of automatic telephone calls to call recipients. In a similar fashion, the facility may implement one or more techniques to deprioritize or block such large call volumes from being received. As yet another example, the facility may also detect certain calls that should be prioritized for handling. For example, a past caller may have had their calls routed to voicemail several times. In such a case, if a new call is detected from the caller, the facility may elect to increase the priority of that call so that the caller receives a human operator.

From the foregoing, it will be appreciated that specific embodiments of the invention have been described herein for purposes of illustration, but that various modifications may be made without deviating from the spirit and scope of the invention. For example, the facility can be implemented in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices, and portions of the invention may reside on a server computer while other portions reside on a client computer. Aspects of the system described herein may be stored or distributed as instructions on computer-readable media, including magnetic- and optically-readable and removable computer discs, stored as firmware in chips (e.g., EEPROM chips), or other storage media, and suitable for execution on one or more processors. Those skilled in the art will appreciate that the actual implementation of the data storage area may take a variety of forms, and the phrase "data storage area" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the steps may be rearranged, steps may be performed in parallel, steps may be omitted, or other steps may be included.

We claim:

1. A computing system for analyzing telephone calls to identify a low quality telephone call and take corrective action, the computing system comprising:
  a memory for storing programmed instructions;
  a processor configured to execute the programmed instructions to perform operations including:
    receiving, by a computing system, a group of telephone calls,
      wherein each telephone call in the received group of telephone calls is associated with one or more call parameters; and
      wherein an audio signal of each telephone call in the received group of telephone calls carries one or more channels;
    for each telephone call in the received group of telephone calls:
      monitoring, by the computing system, a time-in-activity of each of the one or more channels by tracking on each channel when there is activity, wherein the time-in-activity comprises speech activity and non-speech activity;
      determining, by the computing system, whether the monitored time-in-activity of each of the one or more channels is indicative of a low quality telephone call based on a dialogue pattern identified in the one or more channels;
      identifying, by the computing system, call parameters that are correlated with determined low quality telephone calls;
      identifying, by the computing system, a subsequent telephone call to monitor, wherein the subsequent telephone call is associated with one or more call parameters;
      determining, by the computing system, whether one or more call parameters of the subsequent telephone call is present that correlate with determined low quality telephone calls; and
      in response to determining that one or more call parameters of the subsequent telephone call correlate with determined low quality telephone calls, taking a corrective action with respect to the subsequent telephone call.

2. The computing system of claim 1 wherein the monitored time-in-activity is indicative of a low quality telephone call when:
  a predetermined amount of time-in-activity for a first channel of the one or more channels corresponds to speech and a relatively insubstantial amount of time-in-activity for a second channel of the one or more channels corresponds to speech; or
  time-in-activity for the first channel coincides with time-in-activity of the second channel.

3. The computing system of claim 1 wherein the monitored time-in-activity is indicative of a low quality telephone call when no speech is detected on any of the one or more channels, or speech is detected on only one of the one or more channels.

4. The computing system of claim 1 wherein the monitored time-in-activity is indicative of a low quality telephone call when a synthesized voice is detected on any of the one or more channels.

5. The computing system of claim 1 wherein at least one call parameter corresponds to a time, distribution channel, advertiser, or circuit that is associated with the telephone call.

6. The computing system of claim 1 wherein the corrective action is deprioritizing the subsequent telephone such that the subsequent telephone call is allowed to be kept on hold for a longer period of time than a non-deprioritized telephone call.

7. The computing system of claim 1 wherein the corrective action is blocking the subsequent telephone call by preventing the subsequent telephone call from reaching the intended recipient.

8. The computing system of claim 1 wherein the corrective action is providing an alert regarding the presence of the low quality call.

9. The computing system of claim 1 wherein the audio signal of the telephone call is a live, unrecorded telephone call or a pre-recorded file.

10. A method in a computing system for analyzing telephone calls to identify a low quality telephone call and take corrective action, the method comprising:
  receiving, by a computing system, a group of telephone calls,
    wherein each telephone call in the received group of telephone calls is associated with one or more call parameters; and
    wherein an audio signal of each telephone call in the received group of telephone calls carries one or more channels;
  for each telephone call in the received group of telephone calls:

monitoring, by the computing system, a time-in-activity of each of the one or more channels by tracking on each channel when there is activity, wherein the time-in-activity comprises speech activity and non-speech activity;

determining, by the computing system, whether the monitored time-in-activity of each of the one or more channels is indicative of a low quality telephone call based on a dialogue pattern identified in the one or more channels;

identifying, by the computing system, call parameters that are correlated with determined low quality telephone calls;

identifying, by the computing system, a subsequent telephone call to monitor, wherein the subsequent telephone call is associated with one or more call parameters;

determining, by the computing system, whether one or more call parameters of the subsequent telephone call is present that correlate with determined low quality telephone calls; and in response to determining that one or more call parameters of the subsequent telephone call correlate with determined low quality telephone calls, taking a corrective action with respect to the subsequent telephone call.

11. The method of claim 10 wherein the monitored time-in-activity is indicative of a low quality telephone call when:

a predetermined amount of time-in-activity for a first channel of the one or more channels corresponds to speech and a relatively insubstantial amount of time-in-activity for a second channel of the one or more channels corresponds to speech; or time-in-activity for the first channel coincides with time-in-activity of the second channel.

12. The method of claim 10 wherein the monitored time-in-activity is indicative of a low quality telephone call when no speech is detected on any of the one or more channels, or speech is detected on only one of the one or more channels.

13. The method of claim 10 wherein the monitored time-in-activity is indicative of a low quality telephone call when a synthesized voice is detected on any of the one or more channels.

14. The method of claim 10 wherein at least one call parameter corresponds to a time, distribution channel, advertiser, or circuit that is associated with the telephone call.

15. The method of claim 10 wherein the corrective action is deprioritizing the subsequent telephone such that the subsequent telephone call is allowed to be kept on hold for a longer period of time than a non-deprioritized telephone call.

16. The method of claim 10 wherein the corrective action is blocking the subsequent telephone call by preventing the subsequent telephone call from reaching the intended recipient.

17. The computing system of claim 10 wherein the corrective action is providing an alert regarding the presence of the low quality call.

18. The method of claim 10 wherein the audio signal of the telephone call is a live, unrecorded telephone call or a pre-recorded file.

19. The method of claim 10 wherein at least one channel is a client channel and at least one channel is an agent channel.

20. A non-transitory computer readable storage medium with instructions stored thereon that, when executed by a computing system, cause the computing system to perform a method for analyzing telephone calls to identify a low quality telephone call and take corrective action, the method comprising:

receiving, by a computing system, a group of telephone calls,
wherein each telephone call in the received group of telephone calls is associated with one or more call parameters; and
wherein an audio signal of each telephone call in the received group of telephone calls carries one or more channels;

for each telephone call in the received group of telephone calls:
monitoring, by the computing system, a time-in-activity of each of the one or more channels by tracking on each channel when there is activity, wherein the time-in-activity comprises speech activity and non-speech activity;
determining, by the computing system, whether the monitored time-in-activity of each of the one or more channels is indicative of a low quality telephone call based on a dialogue pattern identified in the one or more channels;

identifying, by the computing system, call parameters that are correlated with determined low quality telephone calls;

identifying, by the computing system, a subsequent telephone call to monitor, wherein the subsequent telephone call is associated with one or more call parameters;

determining, by the computing system, whether one or more call parameters of the subsequent telephone call is present that correlate with determined low quality telephone calls; and in response to determining that one or more call parameters of the subsequent telephone call correlate with determined low quality telephone calls, taking a corrective action with respect to the subsequent telephone call.

* * * * *